Nov. 10, 1936.   R. TEATS   2,060,453
PROCESS FOR RECOVERING THALLIUM
Filed July 18, 1934
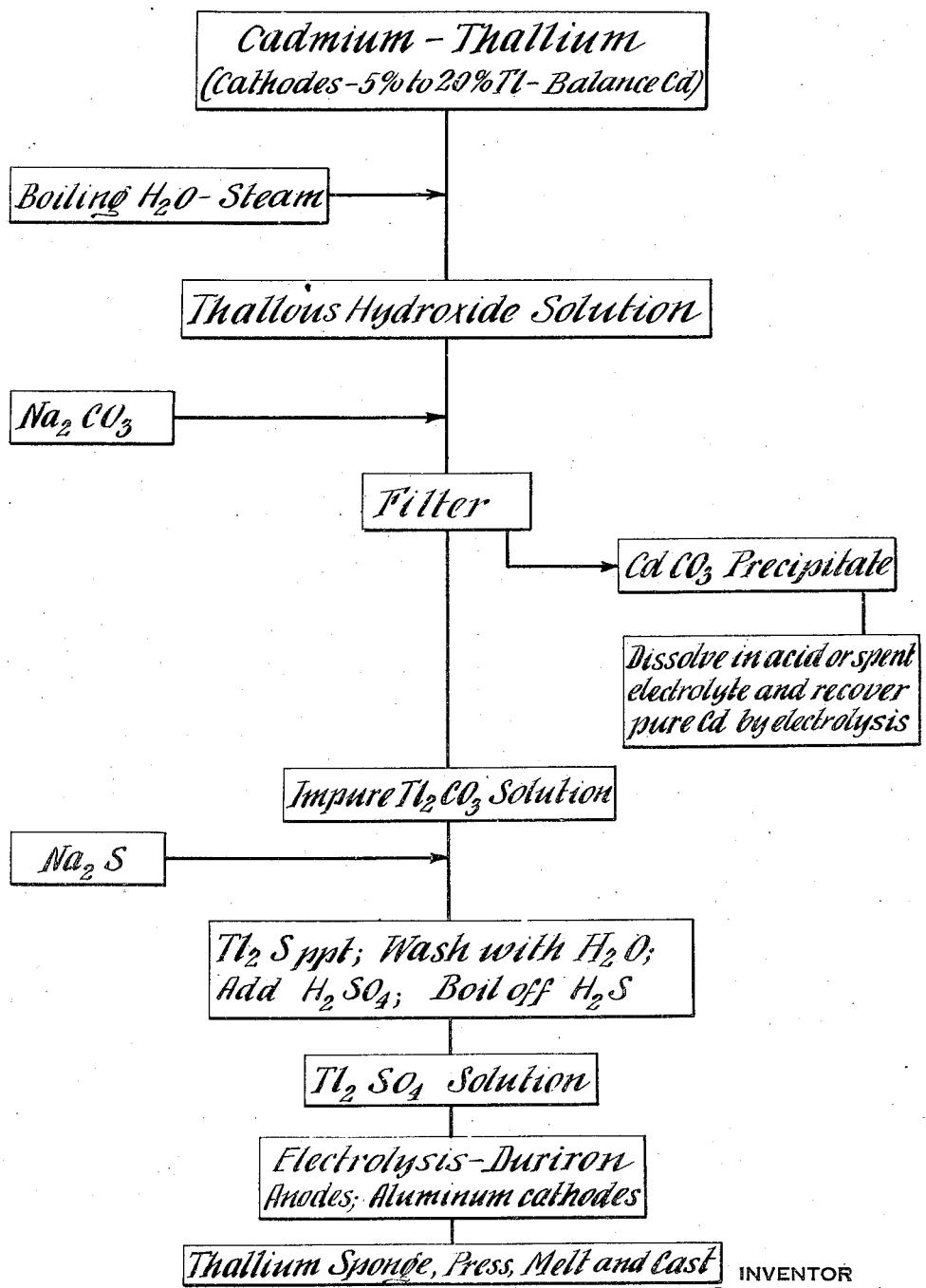

Patented Nov. 10, 1936

2,060,453

UNITED STATES PATENT OFFICE 2,060,453

PROCESS FOR RECOVERING THALLIUM

Roscoe Teats, Denver, Colo., assignor to American Smelting and Refining Company, New York, N. Y., a corporation of New Jersey Application July 18, 1934, Serial No. 735,813

3 Claims. (Cl. 204—15)

This invention relates to the separation of thallium from cadmium and provides a process by which thallium may be readily extracted from mixtures of cadmium and thallium and recovered as pure thallium metal.

The drawing accompanying the specification and forming a part thereof is a flow sheet illustrating the process of the invention.

In accordance with the invention, the metal comprising cadmium and thallium is treated with hot water, preferably in conjunction with steam, with the result that the bulk of the thallium is converted to thallous hydroxide in solution. The small amount of cadmium which enters the solution is precipitated as carbonate and the thallium in turn precipitated from the cadmium-free solution as thallium sulphide which is converted to thallous sulphate in solution and subjected to electrolysis for the recovery of thallium.

More specifically the invention may be practised as follows: cadmium cathodes containing from 5% to 20% thallium are placed in a suitable tank, digested with boiling water, the water drained off, steam passed into the tank and the treatment repeated, say ten to twenty times. The wash waters are combined and contain most of the thallium and very little of the cadmium originally present in the cathodes.

The thallous hydroxide solution is then placed in an agitator tank and sodium carbonate added in sufficient quantities to precipitate the cadmium as cadmium carbonate which is removed by filtration. The cadmium carbonate is then dissolved in acid or spent electrolyte and electrolyzed using insoluble anode and cadmium cathodes and in the presence of suitable addition agents to yield pure cathode cadmium.

Thallium is then precipitated from the impure thallous carbonate solution as thallium sulphide, as by sodium sulphide and the precipitate washed with water and dissolved in sulphuric acid. After boiling to expel sulphur and hydrogen sulphide, the thallous sulphate solution is electrolyzed using duriron anodes and aluminum cathodes, the thallium being deposited as thallium sponge which is pressed, melted and cast into bars of pure thallium metal. If desired the metal may be dissolved with C. P. sulphuric or nitric acids with a minimum amount of water and thallous sulphate or thallous nitrate recovered by crystallization.

While certain novel features of the invention have been disclosed and are pointed out in the annexed claims, it will be understood that various omissions, substitutions and changes may be made by those skilled in the art without departing from the spirit of the invention.

What is claimed is:

1. The process for recovering thallium from cadmium-thallium cathodes which comprises extracting the thallium as thallous hydroxide solution by treating the cathodes with hot water and steam, precipitating cadmium therefrom, precipitating thallium from the cadmium-free solution as thallium sulphide, converting said sulphide to thallous sulphate in solution and recovering thallium from the thallous sulphate solution by electrolysis.

2. The process for separating thallium and cadmium which consists in selectively extracting the thallium by treating a mixture of the two metals alternatively with hot water and steam thereby recovering the thallium as thallous hydroxide in solution.

3. The process for treating cathodes of cadmium and thallium which consists in dissolving out the thallium by repeatedly and alternatively subjecting said cathodes to the action of hot water and steam.

ROSCOE TEATS.